US007266904B2

(12) United States Patent
Hämmerl et al.

(10) Patent No.: US 7,266,904 B2
(45) Date of Patent: Sep. 11, 2007

(54) MEASUREMENT STANDARD FOR SENSING LIFTING HEIGHTS

(75) Inventors: Robert Hämmerl, Hohenthann (DE); Carsten Schöttke, Moosburg (DE); Klaus Schröder, Beilngries (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 3 days.

(21) Appl. No.: 11/169,210

(22) Filed: Jun. 28, 2005

(65) Prior Publication Data

US 2006/0005415 A1 Jan. 12, 2006

(30) Foreign Application Priority Data

Jul. 8, 2004 (DE) ...................... 10 2004 033 170

(51) Int. Cl.
*G01G 3/08* (2006.01)
*A45B 3/08* (2006.01)

(52) U.S. Cl. ......................... 33/706; 177/229; 187/222

(58) Field of Classification Search .................. 33/706, 33/755; 187/222; 177/229
See application file for complete search history.

(56) References Cited

U.S. PATENT DOCUMENTS 3,723,841 A 3/1973 Cotton et al.
3,782,565 A 1/1974 Doran et al.
3,924,729 A * 12/1975 Flinth et al. .................. 177/16
4,096,634 A * 6/1978 Gudel .......................... 33/475
4,130,183 A 12/1978 Tjornemark
4,421,186 A * 12/1983 Bradley ...................... 177/139
6,135,694 A * 10/2000 Trego et al. .................. 414/21
RE37,215 E * 6/2001 Dammeyer et al. ......... 187/222

FOREIGN PATENT DOCUMENTS

CH 654 810 A5 3/1986
DE 198 15 886 A1 10/1999
DE 102 02 506 A1 11/2002
DE 103 14 795 A1 10/2003
JP 09 132399 A 5/1997
JP 11 292498 A 10/1999

OTHER PUBLICATIONS

German Search Report dated Mar. 21, 2005.
Lueger, Lexikon der Technik, Bd. 14, S.366, Stuttgart, 1969.
European Search Report dated Apr. 5, 2007.

* cited by examiner

*Primary Examiner*—Yaritza Guadalupe-McCall
(74) *Attorney, Agent, or Firm*—Scott D. Wofsy; Edwards Angell Palmer & Dodge LLP

(57) ABSTRACT

The invention relates to an industrial truck having a first load-bearing component (12) and a second load-bearing component (14) which are provided such that they can move in relation to one another for the purpose of carrying out a conveying movement, a sensor scale (22) being provided on one of the load-bearing components (14) (scale load-bearing component) for the purpose of detecting the relative movement between the two load-bearing components (12, 14), and a sensor (24), which is designed to detect the sensor scale (22), being provided on the respective other load-bearing component (12) (sensor load-bearing component). The industrial truck is characterized in that the sensor scale (22) is designed integrally on the scale load-bearing component (14) such that a section (**14*a*) of the scale load-bearing component (14) itself is the sensor scale (22**).

11 Claims, 1 Drawing Sheet

MEASUREMENT STANDARD FOR SENSING LIFTING HEIGHTS

The present invention relates to an industrial truck having a first load-bearing component and a second load-bearing component which are provided such that they can move in relation to one another for the purpose of carrying out a conveying movement, a sensor scale being provided on one of the load-bearing components (scale load-bearing component) for the purpose of detecting the relative movement between the two load-bearing components, and a sensor, which is designed to detect the sensor scale, being provided on the respective other load-bearing component (sensor load-bearing component).

Such an industrial truck is known from DE 103 14 795 A1. With the known industrial truck, a sensor scale is fixed to the first load-bearing component using screws. A sensor can move on the second load-bearing component towards and away from the scale against the spring prestress causing it to bear against the sensor scale. This ensures that the sensor has a defined spacing from the scale, and that it can follow possibly load-related deformations of the load-bearing components.

One disadvantage of the known industrial truck is the fact that the sensor scale needs to be fixed to the load-bearing component using screws. This increases the complexity in terms of assembly when producing the industrial truck.

In contrast, it is the object of the present invention to specify a generic industrial truck which can be produced with the same degree of detection accuracy but with less complexity in terms of assembly.

This object is achieved according to the invention by an industrial truck of the type mentioned initially, in the case of which the sensor scale is designed integrally on the scale load-bearing component such that a section of the scale load-bearing component itself is the sensor scale.

In accordance with the basic idea of the present invention, the sensor scale is formed by the material of the scale load-bearing component directly on said scale load-bearing component. Assembly of additional scale supports is therefore not required. The scale load-bearing component thus forms the sensor scale itself.

The sensor scale, which is generally an incremental sensor scale, may be formed in the scale load-bearing component chemically and/or by means of primary forming and/or reforming. If the component is a cast part, a corresponding core which forms the scale can be inserted in the casting mould for the purpose of producing the scale load-bearing component.

As an alternative or in addition, the sensor scale formation on the scale load-bearing component may be formed or processed by means of primary forming, for example by means of impressing and/or embossing and/or milling.

An etching method for the purpose of forming depressions for a sensor scale in the associated load-bearing component is also conceivable in addition or as an alternative to the abovementioned methods.

The sensor scale is generally formed as a kind of relief and has at least one sequence of depressions and elevations which extends essentially in the direction of the relative movement between the two load-bearing components. This relief-type formation of the sensor scale in the scale load-bearing component, which is generally produced from metal, means that an inductive, capacitive or optical sensor can be used as the sensor.

A further disadvantage of the known industrial truck is the fact that the sensor which can move towards and away from the sensor scale is accommodated in a runner surrounding it which slides on the sensor scale. This sliding on the region of the scale which is to be detected by the sensor may contaminate the sensor scale owing to abrasion of the preferably plastic runner, and the detection accuracy of the sensor can thus be impaired. This is particularly the case if the sensor scale is an incremental scale which extends in the manner of a ladder in the direction of the relative movement of the load-bearing components in relation to one another such that, in the event of a relative movement, material of the runner surrounding the sensor is completely removed from the "rungs" of the ladder-like scale. The sensor scale which is merely screwed on can also be damaged by the runner sliding on it.

In order to avoid this disadvantage, in addition or as an alternative to the abovementioned features a generic industrial truck may be designed such that the sensor is accommodated in a sliding block, the sliding block being fixed on the sensor load-bearing component such that it can move in a direction towards and away from the scale load-bearing component and sliding on a sliding surface of the scale load-bearing component, which sliding surface is different from the sensor scale, in the event of a relative movement of the scale load-bearing component and the sensor load-bearing component. Providing a sliding surface on the scale load-bearing component which is different from the sensor scale ensures that the sensor scale itself, i.e. the region to be detected by the sensor, does not come into contact with the sliding block of the sensor and can thus not be adversely affected by it. It is thus possible for a high degree of detection accuracy of the sensor device to be ensured for a very long period of time.

A particularly robust support for the sensor is achieved if the sliding surface has a plurality of parts, the sensor scale extending between two sections of the sliding surface. In this case, the sliding block may pass over the sensor scale in the form of a bridge, the sensor itself being guided over the sensor scale in the bridge section without making contact and at a desired spacing.

In order to ensure the correct spacing between the sensor and the sensor scale, the sliding block may be prestressed so as to bear against the sliding surface.

The described sensor device is preferably used for the purpose of detecting the relative movement in the case of conveying movements. This is possible in a particularly simple manner when a load-bearing component is a stand of a mast or of an additional lift and when the respective other load-bearing component is a lifting frame of the mast or a fork carrier of the additional lift. It is likewise possible for a load-bearing component to be a side frame and for the other load-bearing component to be a stand associated therewith.

The sensor is preferably arranged on the load-bearing component which is moved to a slightly lesser degree in relation to the industrial truck frame since this considerably simplifies the wiring for the sensor. Since the sensor scale is generally passive, i.e. is neither supplied with energy nor outputs signals, it may be arranged on the load-bearing component which is moved to a greater degree with respect to the industrial truck frame without any disadvantages. The stand may therefore be the sensor load-bearing component, and the lifting frame, side frame or fork carrier may be the scale load-bearing component.

The present invention will be explained in more detail below with reference to the attached drawings, in which.

Figure 1:
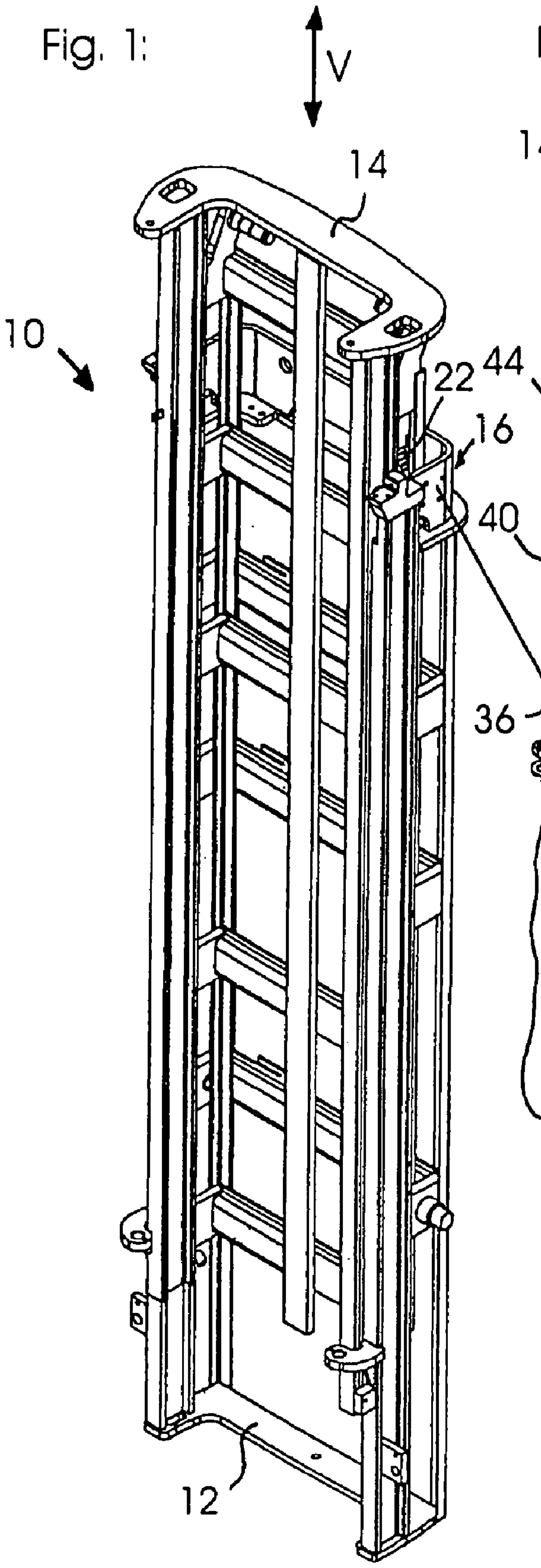
FIG. 1 shows a mast.
Figure 2:
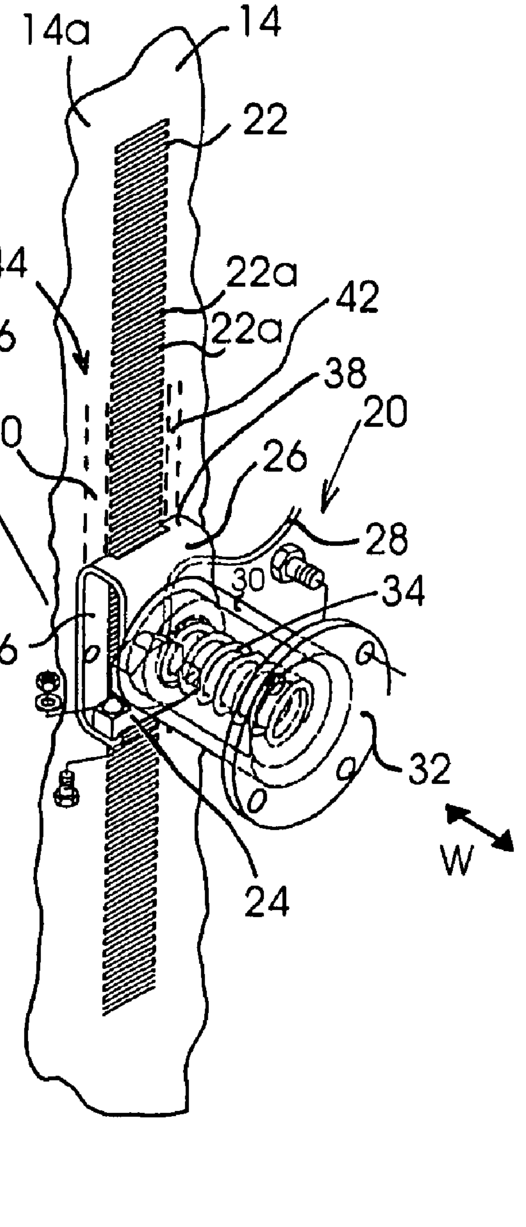
FIG. 2 shows an enlarged, exploded illustration of a sensor which is fixed to the stand and a sensor scale which is formed on the lifting frame.

FIGS. 1 and 2 illustrate an exemplary embodiment of the present invention. FIG. 1 shows a mast which is overall given the reference 10 and comprises a stand 12 which is fixed in position on a frame (not illustrated) of an industrial truck and a lifting frame 14 which is guided thereon such that it can move in the direction of the double arrow V.

A fixing formation 16 for the purpose of fixing a sensor arrangement which is overall given the reference 20 in FIG. 2 is provided on an upper (in FIG. 1) longitudinal end of the stand 12. A sensor scale 22 is provided on the stand 14 opposite the fixing formation 16 such that it faces it. The sensor scale 22 is formed by embossing depressions 22*a* which are arranged one after the other at an equal spacing in the direction of the double arrow V. The sensor scale 22 is an incremental sensor scale 22.

Embossing the depressions 22*a* in a side face 14*a* of the lifting frame 14 may take place in a very simple manner by means of a tool which rolls on the surface 14*a* in the direction of the double arrow V. Projections made of cured metal may be arranged such that they are distributed in the circumferential direction on the circumference of the tool, said projections in this case pressing into the material of the lifting frame 14 when the tool rolls on the surface 14*a*. The procedure corresponds to that for milling a surface.

Owing to the directly integral formation of the sensor scale 22 with the lifting frame 14, a very robust sensor scale is achieved which is capable of providing sufficient accuracy. The procedure for attaching and adjusting a special sensor scale on the lifting frame 14 can be dispensed with. It is merely necessary to take care that the sensor scale 22 is formed in a defined position on the lifting frame 14, which does not, however, represent any problem with today's numerically controlled processing machines. The attachment of the sensor scale to the lifting frame 14 merely represents a further manufacturing step which can be carried out in parallel with other manufacturing steps for the purpose of producing the lifting frame 14 and thus without any notable loss of time.

Express reference is made at this point to the fact that a multi-track, absolute sensor scale may also be provided in place of an incremental sensor scale, for example if different parallel scale tracks which run in the direction of the double arrow V represent a binary number having a plurality of digits having different bit significance. Each track may then be associated with a bit significance. n tracks can therefore represent $2^n$ numbers from 0 to $2^{n-1}$. If the step size of an elevation and a depression of the least significant track is a, the path a●$2^n$ can be encoded with n tracks.

The sensor arrangement 20 comprises a detector 24 which is fixed to a sliding block 26. A data line 28 transmits the detection signals from the detector 24 to a controller or computer unit (not illustrated in FIG. 2). The sliding block 26 is accommodated in a runner 30 of a sensor flange 32 such that it can move in the direction of the double arrow W and is pressed against the surface 14*a* of the lifting frame 14 by a helical compression spring 34 towards the sensor scale 22. This attachment of the detector 24 to the sliding block 26 ensures a spacing between the detector 24 and the sensor scale 22 which is optimal for detection of the elevations and depressions of the sensor scale 22. Load-related deformations of the lifting frame can be compensated for by the movement play of the sliding block 26 in the runner 30.

The sliding block comprises a left-hand (in FIG. 2) sliding section 36 and a right-hand (in FIG. 2) sliding section 38. The sensor scale 22 runs between these sliding sections 36 and 38 without any contact with the sliding block material. In the event of a relative movement of the lifting frame 14 and the stand 12, the sensor arrangement 20, in particular the detector 24, therefore slides over the sensor scale 22 without any contact.

The left-hand sliding section 36 in this case slides on a sliding surface section 40 positioned to the left of the sensor scale 22, whereas the right-hand sliding section 38 slides on a sliding surface section 42 positioned to the right of the sensor scale 22. The sliding surface sections 40 and 42 are indicated by dashed lines in FIG. 2. The sliding surface sections 40 and 42 together form a sliding surface 44.

This design for the sliding block 26, which passes over the sensor scale 22 in the form of a bridge orthogonal with respect to the main direction of extent of said sensor scale 22, on the one hand ensures that the sliding block 26 rests stably on the surface 14*a* of the lifting frame 14 and on the other hand makes it possible to carry out continuous contactless sensing of the sensor scale 22, which results in almost wear-free operation in the detector 24 and on the sensor scale 22. Such a sensor device comprising a sensor scale 22 and a sensor arrangement 20 therefore has a long life with a permanently high degree of detection accuracy.

The invention claimed is:

1. An industrial truck having a scale load-bearing component and a sensor load-bearing component which are provided such that they can move in relation to one another for the purpose of carrying out a conveying movement, a sensor scale being provided on the scale load-bearing component for the purpose of detecting relative movement between the two load-bearing components, and a sensor, which is designed to detect the sensor scale, being provided on the sensor load-bearing component, wherein the sensor scale is designed integrally on the scale load-bearing component such that a section of the scale load-bearing component itself is the sensor scale.

2. An industrial truck according to claim 1, wherein the sensor scale is formed as a kind of relief in the scale load-bearing component.

3. An industrial truck according to claim 2, wherein the sensor scale is cast and/or impressed and/or embossed and/or milled and/or etched into the scale load-bearing component.

4. An industrial truck according to claim 1, wherein the sensor is accommodated in a sliding block, the sliding block being fixed on the sensor load-bearing component such that it can move in a direction (W) towards and away from the scale load-bearing component and sliding on a sliding surface of the scale load-bearing component, which sliding surface is different from the sensor scale, in the event of a relative movement of the scale load-bearing component and the sensor load-bearing component.

5. An industrial truck according to claim 4, wherein the sliding surface has a plurality of parts, the sensor scale extending between two sections of the sliding surface.

6. An industrial truck according to claim 4, wherein the sliding block is prestressed so as to bear against the sliding surface.

7. An industrial truck according to claim 1, wherein a load-bearing component is a stand of a mast or of an additional lift, and in that the respective other load-bearing component is a lifting frame of the mast or a side frame or a fork carrier of the additional lift.

8. An industrial truck according to claim 7, wherein the stand is the sensor load-bearing component, and the lifting frame or fork carrier or side frame is the scale load-bearing component.

9. An industrial truck having a scale load-bearing component and a sensor load-bearing component which are provided such that they can move in relation to one another for the purpose of carrying out a conveying movement, a sensor scale being provided on one of the load-bearing components for the purpose of detecting relative movement between the two load-bearing components, and a sensor, which is designed to detect the sensor scale, being provided on the respective other load-bearing component, wherein the sensor scale is designed integrally on the scale load-bearing component such that a section of the scale load-bearing component itself is the sensor scale, and wherein the sensor is accommodated in a sliding block, the sliding block being fixed on the sensor load-bearing component such that it can move in a direction (W) towards and away from the scale load-bearing component and sliding on a sliding surface of the scale load-bearing component, which sliding surface is different from the sensor scale, in the event of a relative movement of the scale load-bearing component and the sensor load-bearing component.

10. An industrial truck according to claim 9, wherein the sliding surface has a plurality of parts, the sensor scale extending between two sections of the sliding surface.

11. An industrial truck according to claim 9, wherein the sliding block is prestressed so as to bear against the sliding surface.

* * * * *